United States Patent [19]

Keefer

[11] 4,434,056
[45] * Feb. 28, 1984

[54] MULTI-CYLINDER REVERSE OSMOSIS APPARATUS AND METHOD

[76] Inventor: Bowie G. Keefer, 4324 W. 11th Ave., Vancouver, B.C., Canada

[*] Notice: The portion of the term of this patent subsequent to Sep. 8, 1998 has been disclaimed.

[21] Appl. No.: 255,423

[22] Filed: Apr. 20, 1981

Related U.S. Application Data

[63] Continuation-in-part of Ser. No. 27,664, Apr. 6, 1979, Pat. No. 4,288,326, which is a continuation-in-part of Ser. No. 886,429, Mar. 14, 1978, Pat. No. 4,187,173, which is a continuation-in-part of Ser. No. 782,540, Mar. 28, 1977, abandoned.

[51] Int. Cl.³ ..................... B01D 31/00; B01D 13/00
[52] U.S. Cl. .................................. 210/637; 210/652; 210/416.1; 210/433.2; 417/374; 417/541
[58] Field of Search ................................ 417/541, 374; 210/321.1, 433.1, 416.1, 136, 637, 134, 652

[56] References Cited

U.S. PATENT DOCUMENTS 3,687,289  8/1972  Tischler .......................... 210/140 X
4,288,326  9/1981  Keefer ........................... 210/433.2 X Primary Examiner—Frank A. Spear, Jr.
Attorney, Agent, or Firm—Carver & Co.

[57] ABSTRACT

Multi-cylinder reverse osmosis pump having at least three cylinders, each feed cylinder having a displacer rod carrying a displacer to divide the cylinder into respective pumping and expansion chambers. Each displacer rod has an expansion chamber valve portion directly associated therewith to control flow of concentrate fluid relative to an expansion chamber of a cylinder other than that directly associated with the respective cylinder rod. Dwell is provided for each cylinder to permit initial travel of the displacer rod at the beginning of each rod stroke while the corresponding valve controlling that cylinder is closed. The displacer rods are phased apart so that when a particular rod of a particular cylinder reaches an end of each stroke, another rod associated directly with the valve controlling that particular cylinder is approaching the mid-stroke position thereof so that the valve directly associated with the other rod is closing.

25 Claims, 5 Drawing Figures 4,434,056

MULTI-CYLINDER REVERSE OSMOSIS APPARATUS AND METHOD

CROSS REFERENCES TO RELATED APPLICATIONS

This is a continuation-in-part of my copending application Ser. No. 27,664 filed Apr. 6, 1979 entitled ROTARY SHAFT DRIVEN REVERSE OSMOSIS METHOD AND APPARATUS now U.S. Pat. No. 4,288,326, which was in turn a continuation-in-part of my application Ser. No. 886,429 filed Mar. 14, 1978 entitled REVERSE OSMOSIS METHOD AND APPARATUS, now U.S. Pat. No. 4,187,173. My application Ser. No. 886,429 was also a continuation-in-part of my application Ser. No. 782,540 filed Mar. 28, 1977 entitled REVERSE OSMOSIS APPARATUS AND METHOD WITH ENERGY RECOVERY RECIPROCATING PUMP, now abandoned.

BACKGROUND OF THE INVENTION

1. Field of the Invention

The invention relates generally to reverse osmosis and ultrafiltration fluid separation processes, and is particularly applicable to water desalination and purification by reverse osmosis.

2. Prior Art

In reverse osmosis a feed fluid, eg. saline water, is pumped at an elevated working pressure into a pressure vessel containing semi-permeable membranes. Purified product water, eg. the permeate fluid fraction, permeates across the membranes and a more concentrated concentrate fluid fraction is rejected by the membranes at the working pressure. Pressure energy in the rejected concentrate fluid fraction can be recovered to assist in pressurizing the feed fluid during a pumping stroke.

Other inventors have recognized the importance of improving the efficiency of the reverse osmosis process by recovering energy of the concentrate fluid. Such devices are disclosed in U.S. Pat. Nos. 3,558,242 (inventor W. D. Jenkyn-Thomas) and 4,124,228 (inventor L. P. S. Wilson). It would appear that these patents have some practical difficulties relating to valve timing and these difficulties have been reduced considerably by the provision of a dwell means referred to in the present inventor's patent and copending application.

In the prior art, means to reduce the detrimental effects of concentration polarization occurring on the working face of the membranes usually include accumulators to maintain an essentially steady fluid flow across the membrane face to remove the excessively concentrated fluid adjacent thereto. To reduce concentration polarization multi-cylinder reciprocating reverse osmosis pumps have been contemplated and difficulties can arise due to the complexity of valve timing associated with the valves controlling flow of fluid relative to an expansion chamber adapted to receive pressurized concentrate fluid from the membranes to assist in pressurizing feed fluid in an associated pumping chamber. German Offenlegungsschrift No. 24 44 740 (inventor Tuchenhagen) discloses a three cylinder reverse osmosis pump using a rotary valve for directing fluid flow to and from the expansion chamber, the valve being driven directly from a crankshaft actuating pistons of the cylinders.

SUMMARY OF THE INVENTION

The invention reduces the difficulties and disadvantages of the prior art relating to multi-cylinder reverse osmosis pumps by providing a valve means directly associated with each displacer rod actuating a piston of each cylinder, so that the valve means directly incorporated with a displacer rod controls the flow relative to the expansion chamber of another cylinder. The direct incorporation of the valve structure with the displacer rods reduces complexity of the valve timing mechanism and automatically incorporates a valve timing structure which is dependent on the number of cylinders in a cooperating set of cylinders. In particular, the valve controlling the expansion chamber of each cylinder has a closed intermediate position which provides a dwell period with the advantages as will be described.

A reciprocating feed pump according to the invention is for separating a feed fluid into permeate fluid and concentrate fluid fractions which respectively are permeated and rejected by selective membrane means. The pump has at least three feed cylinders in a cooperating set, each cylinder having a displacer reciprocable within the respective cylinder by a displacer rod. The displacer divides each cylinder into expansion and pumping chambers which have relative displacements which determine approximately recovery ratio of the permeate fluid fraction to the total feed fluid flow. Each pumping chamber communicates with valved inlet conduit means to admit feed fluid, and with valved outfeed conduit means to conduct feed fluid to the membranes. Each cylinder also has a corresponding expansion chamber valve means which controls flow relative to the corresponding expansion chamber and has a closed intermediate position between a first open position in which a concentrate return conduit means conducts concentrate fluid from the membranes to the expansion chamber, and a second open position to exhaust depressurized concentrate fluid fraction from the expansion chamber. Each cylinder further has associated dwell means to permit initial travel of the displacer rod of each cylinder following a beginning of each respective displacement rod stroke while the corresponding expansion valve means controlling that cylinder is in the closed intermediate position thereof. The pump is further characterized by each expansion chamber having a valve portion associated directly with the respective displacement rod of each cylinder and a drive means cooperating with the displacer rods of the cylinders. Each valve portion is a portion of an expansion valve means controlling a cylinder other than that directly associated with the respective displacer rod. The drive means cooperates with the displacer rods of the cylinders so that the cylinders are phased apart in such a way that when a particular displacer rod of a particular cylinder reaches an end of each stroke thereof, another displacer rod that is associated directly with and thus actuates, the expansion chamber valve means controlling that particular cylinder is approaching a mid-stroke position of said other displacer rod so that the expansion chamber valve means directly associated with said other displacer rod is entering the closed intermediate position thereof.

A method according to the invention relates to exposing selective membrane means to pressurized feed fluid supplied by a reciprocating feed pump having at least three feed cylinders in a cooperating set, each cylinder having a displacer means which is reciprocable within the respective feed cylinder. The displacer means divides the respective cylinder into a pumping chamber in which, during a pumping stroke, feed fluid is pressurized and an expansion chamber in which concentrate fluid is depressurized. Each cylinder has a displacer rod for reciprocating the respective displacer means and each cylinder cooperates with valve means in conduit means which communicate with the membrane means. The valve means includes an expansion chamber valve means having a closed intermediate position between two open positions thereof and being adapted for controlling fluid flow relative to the respective expansion chamber. Each cylinder also has dwell means associated therewith to permit initial travel of the displacer rod of each cylinder following a beginning of each respective displacer rod stroke while the corresponding expansion chamber valve means controlling that cylinder is in the closed intermediate position thereof. The method, which occurs in each cylinder, includes the steps of inducting feed fluid into a particular pumping chamber and simultaneously exhausting concentrate fluid from a corresponding expansion chamber during an induction stroke, which is followed by pressurizing the feed fluid in the pumping chamber and simultaneously admitting pressurized concentrate fluid into the corresponding expansion chamber to supplement energy supplied to the displacer means during the pumping stroke. The method is further characterized by actuating directly with a displacer rod a valve portion of an associated expansion chamber valve means so as to control flow relative to an expansion chamber of a cylinder other than that directly associated with the displacer rod. The method also includes actuating the displacer rods of the cylinders so that actuation of the expansion chamber valve means is phased in such a way that when a particular displacer rod of a particular cylinder reaches an end of each stroke thereof, another displacer rod associated directly with the expansion chamber valve means controlling that particular cylinder is approaching a mid-stroke position of said other displacer rod, so that the expansion chamber valve means directly associated with the other displacer rod is entering the closed intermediate position thereof during which no fluid passes therethrough.

A detailed disclosure following, related to drawings, describes preferred apparatus and method of the invention which, however, are capable of expression in apparatus and method other than that particularly described and illustrated.

DETAILED DISCLOSURE

FIG. 1

Figure 1:
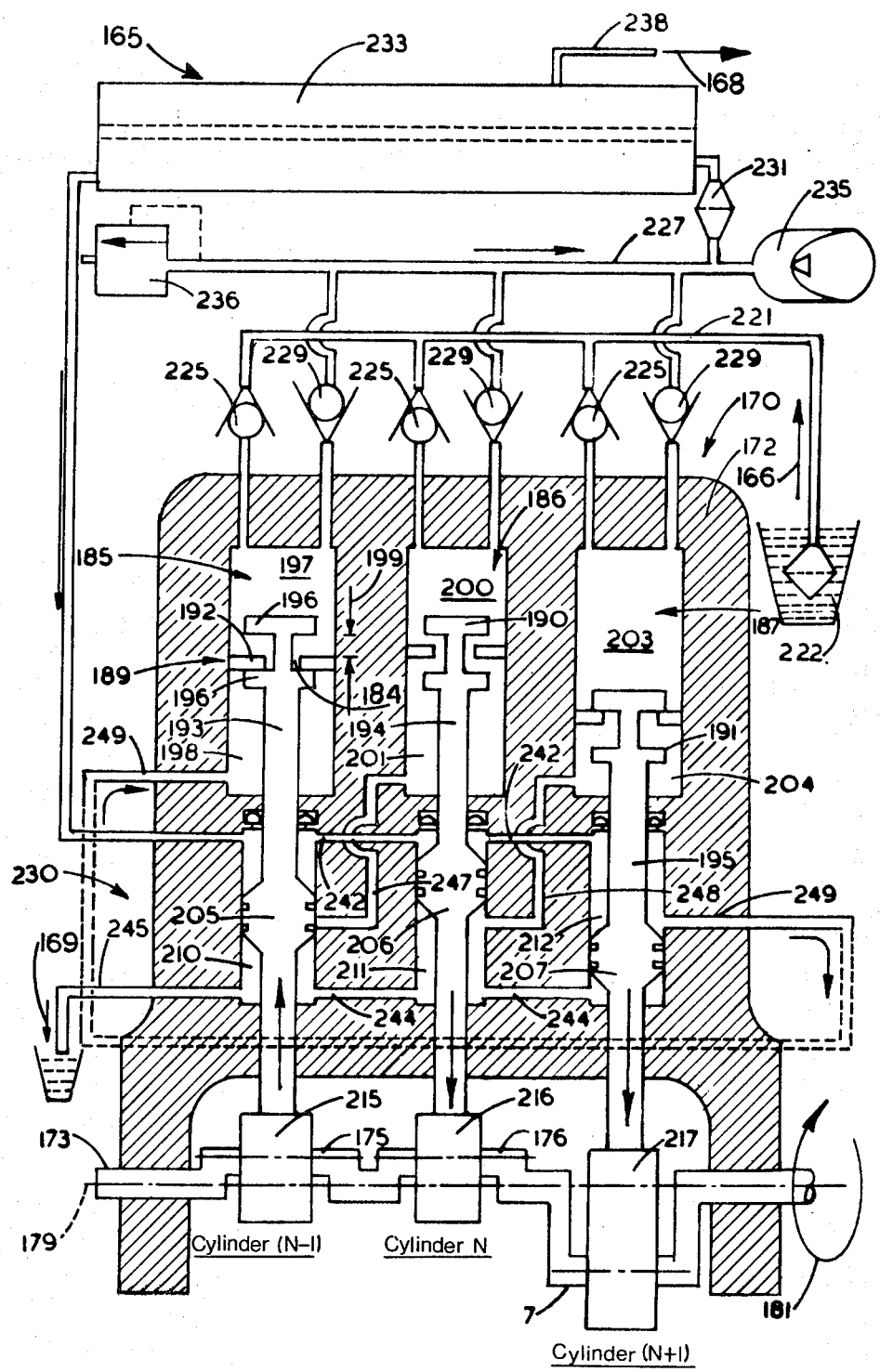
FIG. 1 is a simplified diagramatic section through a three cylinder or triplex feed pump according to the invention, in particular the valve mechanism and displacer being shown in simplified diagrammatic form.

An apparatus 165 is for separating a feed fluid 166 into a permeate fluid fraction 168 and a concentrate fluid fraction 169, direction of flow of the fluids being shown by correspondingly designated arrows. The apparatus includes a triplex feed pump assembly 170 according to the invention, the pump having a crankcase 172 and a crankshaft 173 having three throws or crank pins 175, 176 and 177, the shaft being journalled for rotation about an axis 179. In the description following, the crankshaft rotates in the direction of an arrow 181 and the three throws are spaced equally 120° apart as in a conventional three-throw crankshaft.

The pump assembly 170 includes first, second and third feed cylinders 185, 186 and 187, corresponding to the throws 175, 176 and 177, each cylinder having first, second and third feed piston means or feed displacers 189, 190 and 191, having respective piston rod means or feed displacer rods 193, 194 and 195. Each feed displacer is shown diagrammatically and can be considered to be a resilient or yieldable displacer means which, upon reversal of displacer rod movement, permits a relatively small movement of the displacer rod without corresponding displacer travel. Thus, for example, the first piston means 189 includes a rigid piston disc 192 having a central bore 184 and is fitted between spaced stops 196 on the rod means 193 and cooperates with the piston rod to permit relative axial sliding movement between the disc and rod. Spacing 199 between oppositely facing faces of one of the stops 196 and the disc 192 defines maximum relative movement between the displacer rod means and piston disc and is described in greater detail in the present inventor's U.S. Pat. No. 4,187,173 but will be briefly discussed later herein. Equivalent yieldable displacers can be substituted, as will be shown in FIGS. 3 and 5. Other dwell means are disclosed in the present inventor's copending U.S. patent application Ser. No. 173,456, filed July 30, 1980.

Each piston means divides the respective cylinder into a pumping chamber and an expansion chamber, so that the first cylinder 185 has first pumping and expansion chambers 197 and 198, the second cylinder 186 has second pumping and expansion chambers 200 and 201, and the third cylinder has third pumping and expansion chambers 203 and 204 respectively. The displacer rod means of each cylinder extends through the expansion chamber to cooperate with the respective throw of the crankshaft in such a manner as will be described so that three piston means are phased 120° apart. Because the displacer rod extends through the expansion chamber, the expansion chamber has a displacement or swept volume less than the pumping chamber, and, in a manner similar to other reverse osmosis devices, the expansion and pumping chambers have relative displacements or swept volumes which determine approximately recovery ratio of permeate fluid flow to total feed fluid flow.

The first, second and third cylinders 185 through 187 have respective first, second and third valve spools 205, 206 and 207 and first, second and third valve chambers 210, 211 and 212 respectively, each spool being reciprocable within the respective valve chamber. The valve spools have inner ends directly connected to the respective piston rod means, and outer ends cooperating with respective connecting means 215, 216 and 217 which themselves cooperate with the respective crank throws. The spools are aligned and are shown diagrammatically to be integral with the respective displacer rods and reciprocate concurrently with the respective displacer means, but connections between a separate valve spool and displacer rod can be used. The connecting means cooperating with the crankshaft are shown diagrammatically and can be links hinged to the outer ends of the spools so as to interconnect the crank throw and spool, or other equivalent connecting means to accommodate the lateral movement of the throw can be incorporated. Clearly cam means, equivalent rotary drive means or other drive means can be substituted provided the displacers are phased apart at appropriate intervals.

The apparatus 165 also includes conduit means and associated equipment cooperating with the feed pump 170 as follows. Inlet conduit means 221 extend from a feed fluid supply 222 through undesignated inlet conduit portions having similar inlet check valves 225 to communicate with the pumping chambers 197, 200 and 203 of the feed cylinders. Outfeed conduit means 227 connect the pumping chambers through undesignated conduit portions having outfeed check valves 229 and a filter 231 to a membrane pressure vessel 233. A hydraulic accumulator 235 to reduce pressure and flow fluctuations across the membranes, and a pressure relief valve 236 to control maximum system pressure, communicate with the outfeed conduit means 227. A permeate conduit 238 discharges the permeate fluid fraction 168 from the membranes, and a concentrate return conduit means 240 extends between the membranes and the feed pump assembly 170 to return concentrate fluid to the expansion chambers of the feed pump as will be described.

It can be seen that the inlet conduit means 221 is valved and communicates the feed fluid supply with the respective pumping chambers to admit feed fluid into the pumping chambers, and the outfeed conduit means 227 is valved and communicates each pumping chamber with the membrane means so as to conduct pressurized feed fluid from the pumping chambers to the membrane means. The check valves 225 and 229 can be seen to control direction of feed fluid flow relative to the pumping chambers, and as will be described, the valve spools within the respective valve chambers serve as expansion chamber valve means 230 to direct concentrate fluid flow relative to the expansion chambers.

Inner ends of the valve chambers 210, 211 and 212 are interconnected by concentrate return conduit portions 242 which are effectively portions of and communicate with the return conduit means 240. Outer ends of the valve chambers are interconnected by exhaust conduit portions 244 which are also portions of and communicate with a main exhaust conduit 245. Delivery conduit means 247 and 248 extend between respective intermediate portions of the first and second valve chambers 210 and 211 to communicate with the second and third expansion chambers 201 and 204 respectively. A similar delivery conduit means 249 extends from an intermediate position of the third valve chamber 212 to communicate with the expansion chamber 198 of the first cylinder, it being noted that this delivery conduit means is shown in broken outline and routed diagrammatically and is equivalent to the delivery conduit interconnections between the previously described valve chambers and expansion chambers.

Thus, it can be seen that each valve chamber has at one end thereof a concentrate conduit portion to communicate with the concentrate return conduit means, and an opposite end thereof interconnected exhaust conduit means. Adjacent an intermediate position between ends of the valve chamber, delivery conduit means interconnect the valve chamber adjacent to or directly associated with one cylinder with the expansion chamber of one of the remaining cylinders. In effect, the return conduit means 240 communicates the membrane means with the expansion chambers of each cylinder so as to conduct the concentrate fluid fraction from the membrane means to the expansion chambers of the feed cylinder. It can be seen that, in view of the phase difference between the cylinders, there is a phase difference between each cylinder and the expansion valve means controlling that particular cylinder.

As will be described in greater detail with reference to FIG. 3, each valve spool has a valve land or closure portion and is subjected to reciprocation within the respective valve chamber to close off the delivery conduit while permitting fluid connections between the adjacent concentrate return conduit portions and exhaust conduit portions. At a particular instant as shown in FIG. 1, the first valve spool 205 of the first valve chamber 210 is in an intermediate position and the adjacent delivery fluid conduit 247 is closed; the second valve spool 206 of the chamber is positioned to maintain the conduit means 248 open to exhaust depressurized concentrate fluid from the expansion chamber 204 of the third cylinder, and the third spool 207 is positioned to maintain the conduit means 249 open to direct pressurized concentrate fluid from the membrane means into the expansion chamber 198 of the first cylinder 185. The valve spools and piston rod means are shifting in the directions shown by undesignated arrows, and it can be seen the first cylinder 185 is experiencing a pumping stroke, the second cylinder 186 is about to start an induction stroke, and the third cylinder 187 is completing an induction stroke. It can be seen that the drive means, ie. the crankshaft, cooperates with the displacer rods so that when a displacer rod of a particular cylinder completes a stroke travelling in one direction, another displacer rod having a valve portion which controls that particular cylinder is approaching the mid stroke position thereof, ie. the mid position of the stroke of said other rod, travelling in the same direction.

It can be seen that the closure portion of the valve spool is located on the spool so as to be in an intermediate position of the valve chamber when the displacer rod directly associated therewith is at approximate mid stroke position. Thus, when the spool is in its intermediate position, the closure portion closes the respective delivery conduit and prevents flow of concentrate fluid relative to an expansion chamber that is controlled by the particular valve. In opposite extreme positions of the valve spool, the delivery conduit is open, and thus, it can be seen that the expansion valve means of a particular cylinder has a closed intermediate position between first and second open positions, the closed position being shown for the valve spool 205. The first open position is shown for the valve spool 207 in the chamber 212 in which concentrate return conduit means and portions thereof conduct concentrate fluid from the membranes to the expansion chamber 198 in a pumping stroke of the feed cylinder 189, and the second open position is shown for the spool 206 in the chamber 211 in which depressurized concentrate fluid is exhausted from the expansion chamber 204 of the cylinder 187 which is experiencing an induction stroke.

It is important that the expansion chamber valve means has a closed intermediate position to prevent loss of pressure from the pressurized concentrate fluid from the membranes to the exhaust conduit, and likewise to prevent hydraulic lock of the spool within the chamber. This is attained by providing a dwell interval between the two open positions that occurs during the closed intermediate position and following the beginning of each respective displacer rod stroke in a cylinder controlled by that particular valve.

The dwell interval can be defined as a dwell angle which represents angular rotation of the crankshaft that occurs during the closed intermediate position of a particular expansion chamber valve means. Dwell angle is dependent on the angular separation or phase angle between a particular cylinder and the valve controlling the cylinder which can be seen to be dependent on the phase angle between cylinders. To prevent excessive pressure fluctuations within the feed cylinder following reversal of displacer rod movement, the dwell means also permits a relatively small movement of the displacer rod without a corresponding displacer movement, the small movement being proportional to the spacing 199 between one of the stops 196 and the disc. This is more easily understood by reference to the timing diagram shown in FIG. 2. For a triplex pump, the dwell angle is 60° as will be explained later.

Figure 2:
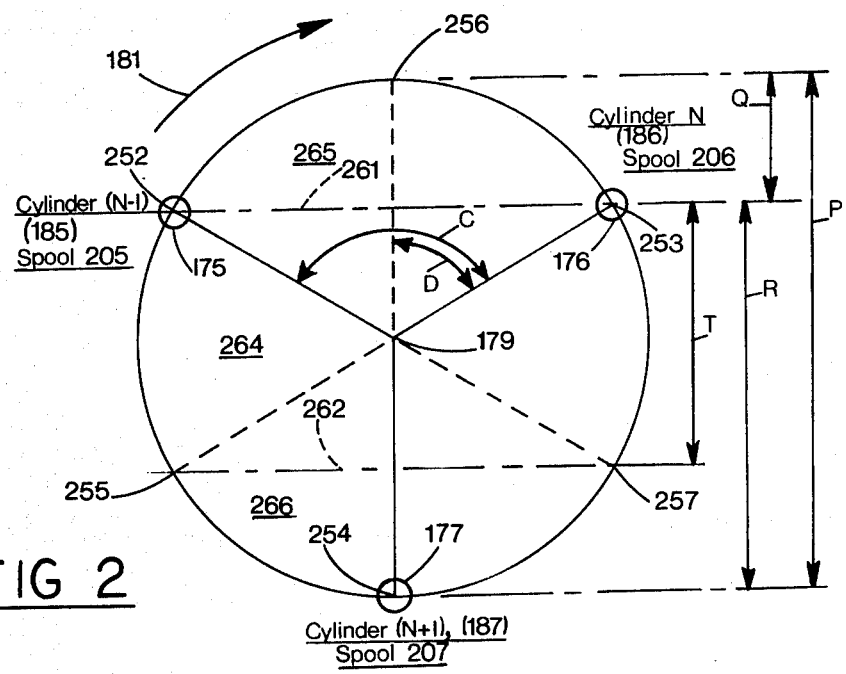
FIG. 2 is a simplified timing diagram for the three cylinder feed pump showing phase relationships between associated cylinders and respective expansion chamber valve means.

FIG. 2, with reference to FIG. 1

The relative relationship of pump components as shown in FIG. 1 is reflected in FIG. 2 where it can be seen that the crank throw or crank pin 175 relating to the cylinder 185 is approaching top dead center (TDC) after leaving a mid stroke position, the crank pin 176 relating to the cylinder 186 has left top dead center and is approaching a mid stroke position, and the crank pin 177 of the cylinder 187 is at bottom dead center (BDC) at the end of an induction stroke, and the beginning of a pumping stroke. As seen in FIG. 1, the third valve spool 207 associated with the crank pin 177 of cylinder 187 controls the fluid flow to and from the expansion chamber of the feed cylinder 185, which has a displacer means carried on the crank pin 175. Similarly, the spool 205 associated with the crank pin 175 of cylinder 185 controls flow to and from the expansion chamber of cylinder 186. In the discussion following, the term "valve" refers to the expansion chamber valve means only, and not the valves associated with the pumping chamber. Expressed mathematically, the valve on the crank pin of cylinder N controls the fluid flow relative to the expansion chamber of cylinder N+1, where N increases in the direction of rotation of the crankshaft. Thus, the valve is angularly spaced or phased from its associated cylinder by a phase angle C which in this instance is 120° and is equivalent to the phase angle between cylinders disclosed in applicant's prior patent aforesaid. Thus, the crank pin cooperating with a particular valve follows or lags by the phase angle the crank pin cooperating with the cylinder which is controlled by that particular valve. As can be seen from the three cylinders, the valve of cylinder N lags that particular cylinder it controls, ie. cylinder N+1, by the phase angle C. For this discussion, if the cylinder 186 is designated cylinder N, the cylinder 185 is cylinder N−1, and the cylinder 187 is cylinder N+1.

Thus the displacer rods are phased equally apart at 120°, and with respect to direction of rotation, those cylinders lagging and leading the particular cylinder N by 120° are designated N−1 and N+1. Also the cylinder N has an adjacent expansion chamber valve means associated directly therewith which controls the expansion chamber of the remote controlled cylinder N+1, and has an expansion chamber which is controlled by the remote controlling valve means which is associated directly with a cylinder N−1.

In the discussion following, it is assumed that angular rotation of the crankshaft during which the valve associated with a particular cylinder is closed, ie. the previously defined dwell angle, is essentially equal to the angular rotation of the crankshaft during which there is displacer rod travel but no corresponding displacer travel, ie. at the beginning of each displacer stroke. The dwell angle results in lost motion for the displacer causing a corresponding loss of fluid volume displacement relative to the cylinder. There are minor angular differences between these two rotations, but these differences relate to valve design and porting sizes, and can be as little as 3° to 5° of rotation, and thus, the approximation is realistic for the purpose of understanding these diagrams.

In FIG. 2, relative positions of the three crank pins or throws 175, 176 and 177 are shown in full outline at points 252, 253 and 254 respectively on a circle centered on the crankshaft central axis 179. The cylinder and valve spool directly associated with a particular crank pin are designated in brackets adjacent the crank pin. Upwards vertical direction in the diagram represents displacer rod and displacer movement occurring in a pumping stroke, and diameter of the circle, which represents twice the radial measurement of eccentricity of the crank throw, is designated P and represents total displacer rod stroke. The relative position of each displacer rod can be displayed on the vertical axis by projecting horizontally from the position of its crank pin on the circle. As stated previously, the triplex pump 170 has a dwell angle D of 60° and the valve actuation lags the piston/displacer actuation by the phase angle C of 120° which, in this instance, is twice the dwell angle. The angular dwell intervals of 60° for the crank pins 175, 176 and 177 are shown as broken lines which are lagging the corresponding crank pin and intersect the circumference of the circle at points 255, 256 and 257 respectively. Two parallel lines 261 and 262 extend between the points 252 and 253, and between the points 255 and 257 respectively, and are spaced apart at a spacing T, which represents nominal linear sealing length of the valve spool as will be described with reference to FIG. 3. This spacing T represents a distance which corresponds to the closed intermediate position of the valve separating the two open positions on opposite sides of the lines 261 and 262. Thus the two portions of the circumference between the lines 261 and 262 represent the closed position of the valve, and the two remaining portions represent the open positions of the valve. Lost motion resulting from the spacing 199 between the stops of the displacer rod results in a reduced displacer stroke R, a difference Q between lengths of the strokes P and R corresponding to the spacing 199. Thus, difference Q represents linear lost motion of the displacer occurring during rotation of the crankshaft through the dwell angle D.

The valve diagram can be used to ascertain, at a particular instant, which valves are open or are about to be opened, and which valves are closed, or are about to be closed. For example, at the instant shown in FIG. 2, it can be seen that the valve spool 207 on crank pin 177, that is the valve controlling cylinder 185, is in the middle of an open position, the valve spool 205 on crank pin 175 controlling cylinder 186 is about to open the expansion chamber thereof following the closed intermediate position, and the valve spool 206 on the crank pin 176, controlling cylinder 187 has just completed an open position and is about to enter the closed intermediate position. It can be seen that this diagram is compatible with the instant of time for which FIG. 1 is drawn, and the crankshaft can be repositioned to represent other crankshaft orientations which occur as the crankshaft rotates. Thus, when a crank pin is disposed in a central equatorial portion 264 bounded by the two lines 261 and 262 and equatorial arcs of the circle circumference, the valve associated with that crank pin is in the closed intermediate position. Also, when the crank pin of cylinder N carrying its particular valve enters an upper polar segment 265 bounded by the line 261 and a small portion of the circumference, that valve exposes the expansion chamber of the controlled cylinder N+1 to exhaust. Similarly, when the crank pin of cylinder N enters a low polar segment 266 bounded by the line 262, the valve thereon opens the expansion chamber of cylinder N+1 to membrane operating pressure.

For a dwell angle D of 60°, the linear lost motion or Q between the displacer and the displacer rod is about 25%, ie. about one-quarter, of the stroke P of the feed displacer rod. Thus, for the triplex pump means, the displacer has a stroke of 75% of the stroke of the displacer rod, and thus the 60° dwell angle produces a loss of about 25% of theoretical maximum displacement which reduces volumetric capacity of the pump. Also, assuming quasi simple harmonic motion of the displacer rod, at high rpm the feed displacer rod can be travelling with a relatively high velocity when the stop thereon contacts the stationary feed displacer at the end of the dwell interval. The relatively high velocity results in relatively high impact loads which can be absorbed by using a flexible displacer or resilient stops, but this aspect can be a determining factor limiting speed of operation of the triplex pump.

Figure 3:
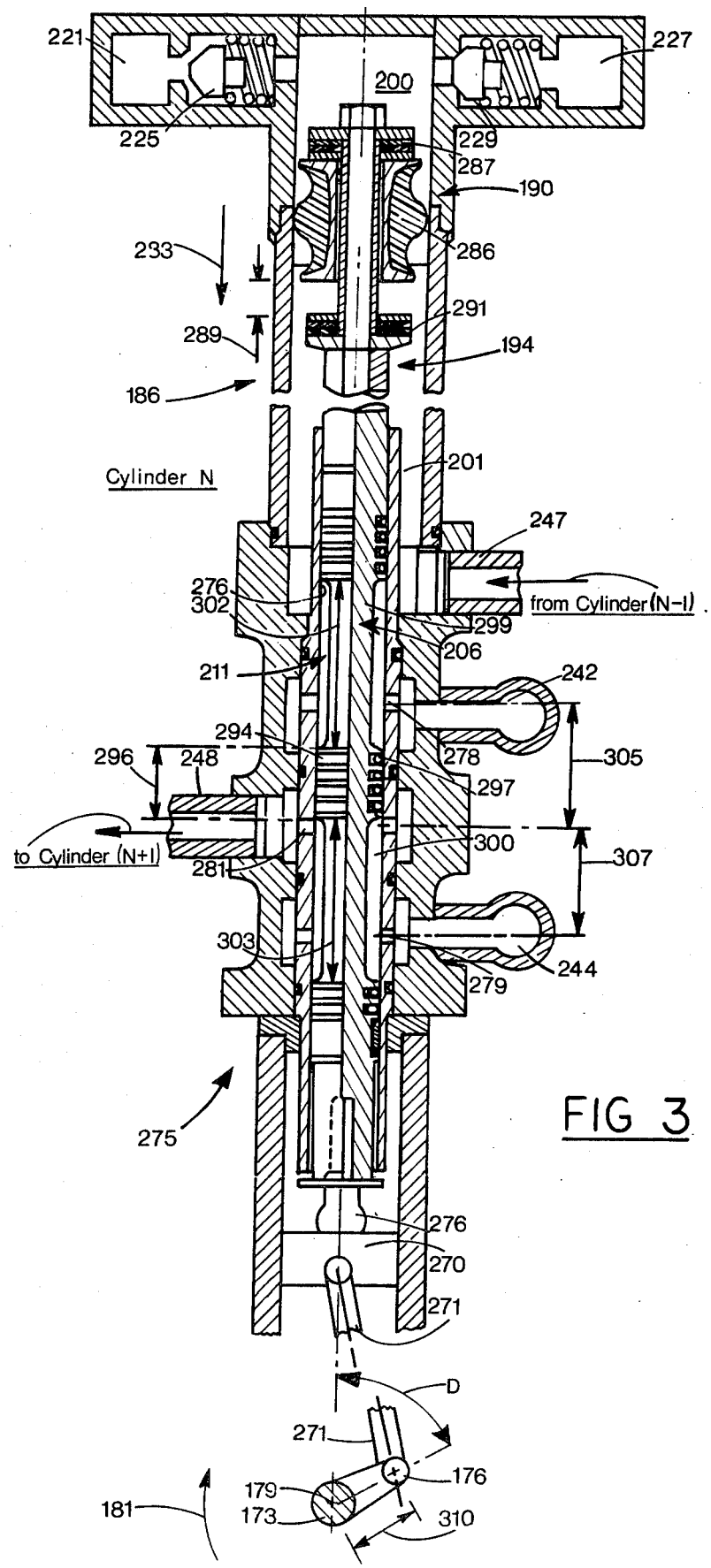
FIG. 3 is a simplified longitudinal section through a typical expansion chamber valve means and associated displacer rod, showing one type of displacer means.

FIG. 3, with reference to FIG. 1

FIG. 1 is a diagramatic representation of the spool valves and associated valve chambers of expansion chamber valve means for each cylinder. This particular structure will now be disclosed in more detail for a clearer understanding of the relationship between lost motion associated with the displacer means and displacer rod, and the spool valve structure itself.

In this example, the feed cylinder 186 is to be described and is termed cylinder N, it being understood that the cylinder 185, termed cylinder N−1 and the cylinder 187, termed cylinder N+1, are structurally and functionally similar. The crank throw 176 is coupled to a crosshead 270 by a connecting rod 271. The displacer rod 194 has a self-aligning connecting means 276 cooperating with the crosshead to transfer the crankshaft rotating motion to quasi simple harmonic motion for the displacer rod 194 and thus serves as the connecting means 216.

The cylinder 186 has an expansion chamber valve means 275 having the valve chamber 211 which has a bore 276 to accept the valve spool 206 to be reciprocable therein. The valve chamber has a concentrate return port 278 communicating with the concentrate return conduit portion 242 to admit concentrate fluid from the membranes, and an exhaust port 279 communicating with the exhaust conduit portion 244 to exhaust concentrate fluid. The chamber also has a delivery port 281 communicating with the delivery conduit 248 to communicate with the expansion chamber of the cylinder N+1, not shown, which is controlled by the expansion valve means 275. The delivery conduit 247 communicates the expansion chamber 201 with the valve directly associated with cylinder N−1, not shown.

As drawn, the displacer rod is travelling in direction of an arrow 283 during an induction stroke, and it can be seen that the feed displacer 190 has a piston disc 286 held against an upper stop 287 at an end of the displacer rod 194. A spacing 289 exists between a lower stop 291 and an opposed face of the piston disc 286 and is equivalent to the spacing 199 of FIG. 1 relating to the displacer means 189 and is about one-quarter of the displacer rod stroke. The disc 286 has a resilient outer portion which deflects substantially in shear, the deflection providing exchange of volume between the expansion and pumping chambers upon reversal of stroke of the piston rod, and serves as a portion of the dwell means of each cylinder. The dwell means is thus operatively associated with the pumping and expansion chambers thereof to exchange volume between the chambers of a particular cylinder while the corresponding expansion valve means controlling that particular cylinder is in the closed intermediate position thereof, so as to reduce chances of hydraulic lock of the displacer means. Furthermore, similarly to the single cylinder embodiment previously described in the applicant's patent, the pump has plunger means associated with each displacer rod to vary volume of the displacer rod in a particular cylinder after the beginning of each stroke and whilst the respective expansion valve means controlling that cylinder is in the closed intermediate position thereof, so that pressures across ports of the respective expansion valve means that are about to be opened are approximately equalized prior to opening of such ports.

The spool 206 has a central land or closure portion 294 which has a closure length 296 and is fitted with a plurality of piston ring seals 297 of material of high wear resistance and high corrosion resistance to the fluid. Upper and lower clearance portions 299 and 300 are provided on opposite sides of the central land 294 and have approximately equal clearance portion lengths 302 and 303 respectively. Portions of the displacer rod adjacent opposite ends of the clearance portions remote from the central portion are also provided with undesignated piston ring seals similar to those provided on the closure portion. As stated with reference to FIG. 2, T is the valve spool closed intermediate or center length and by inspection, it can be seen that T is derived from the following equation:

sealing length $T = P \sin D/2 = P (\sin 30°) = 0.5P$

This figure is modified slightly to accomodate the non-linearity of a conventional crank and piston stroke, that is the well known deviation from the simple harmonic motion of the displacer rod, and sizes and design of the ports and land. Thus, the closure length 296, which is commonly termed valve overlap, is approximately equal to one-half the displacer rod stroke. This represents the nominal spool length available for sealing the valve ports and of course is determined by stroke of the valve spool during the dwell interval. Upper port spacing 305 between the concentrate return port 278 and the delivery port 281 is approximately equal to lower port spacing 307 between thhe delivery port 281 and exhaust port 282. In effect, the ports 278 and 279 must be spaced sufficiently apart to avoid being closed by the closure portion 294, and thus the sum of the spacings 305 and 307 must be equal to or greater than the closure length 296 plus the displacer rod stroke, which is approximately 150% of displacer rod stroke. Thus the port spacings 305 and 307 are each at least three-quarters of the displacer rod stroke, which stroke is twice eccentricity or throw 310 of the crankshaft. Thus, the valve spool has a closure portion disposed between two clearance portions, and the closure portion has a valve overlap length of about one-half of the displacer rod stroke, which is less than spacing between two adjacent ports of the valve chamber.

The sealing length T provides a considerable length of valve spool to effect sealing and for positioning the piston ring seals and thus leakage of fluid between adjacent ports is substantially reduced or completely eliminated. Furthermore, it can be seen that a valve portion, that is the spool valve, has a closure portion positioned relative to the ports of the valve chamber so that the closure portion prevents direct flow of fluid between the concentrate port and exhaust port, but never directly obstructs these ports. Furthermore, it can be seen that the concentrate return port is located at an end of the valve chamber adjacent the cylinder directly associated with the expansion valve means, so that pressure difference between the concentrate port and the expansion chamber fluctuates less than it would if the exhaust port were positioned directly adjacent the cylinder directly associated with the valve means. This is because the exhaust port is always at a low pressure in contact to the concentrate port which is always at a high pressure. Thus, to reduce pressure fluctuations across the seals of the spool valve, the exhaust port is located at an end of the valve chamber remote from the cylinder directly associated therewith.

OPERATION

The operation of the triplex feed pump 170 can be seen to be a combination of three single feed cylinder pumps with energy recovery derived sequentially from the returning concentrate fluid means. A detailed description of the fluid flow between a single cylinder pump and the membrane means is described in the present inventor's United States patent and is not repeated here. The feed pumps are phased equally apart in a complete revolution and it can be seen that the valve spool connected to one displacer rod means controls the direction of pressurized concentrate fluid flow from the membrane means to the expansion chamber of one of the remaining two cylinders. Feed fluid flow over the membrane means is characterized by three distinct pressure pulses of fluid during each revolution of the crankshaft, which, at suitable crankshaft RPM, essentially eliminates stagnant flow conditions and also permits reduction in the size of the accumulator 235, FIG. 1, or in the differential surge absorber used in the single cylinder arrangement. Thus, concentration polarization is reduced considerably from a single cylinder pump.

In summary, each cylinder has associated dwell means to permit initial travel of the displacer rod of each cylinder following a beginning of each respective displacer rod stroke while the corresponding expansion chamber valve controlling that cylinder is in the closed intermediate position thereof. The pump has a valve portion associated directly with the respective displacer rod of each cylinder, each valve portion being an expansion chamber valve means controlling a cylinder other than that directly associated with the respective displacer rod. The pump also has drive means cooperating with the displacer rods of the cylinders so that the cylinders are phased apart in such a way that when a particular displacer rod of a particular cylinder reaches an end of each stroke thereof, another displacer rod associated directly with expansion chamber valve means controlling that particular cylinder is approaching a mid stroke position of said other displacer rod so that the expansion chamber valve means directly associated with said other displacer rod is entering the closed intermediate position thereof.

ALTERNATIVES AND EQUIVALENTS

Figure 4:
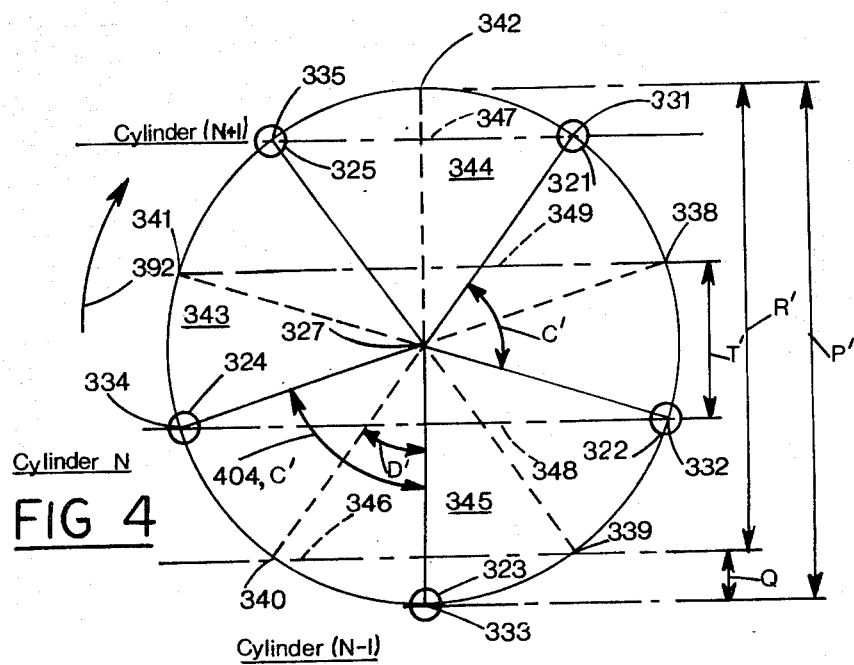
FIG. 4 is a simplified timing diagram showing phase relationship between displacers and associated expansion chamber valve means of a five cylinder or quintuplex feed pump.
Figure 5:
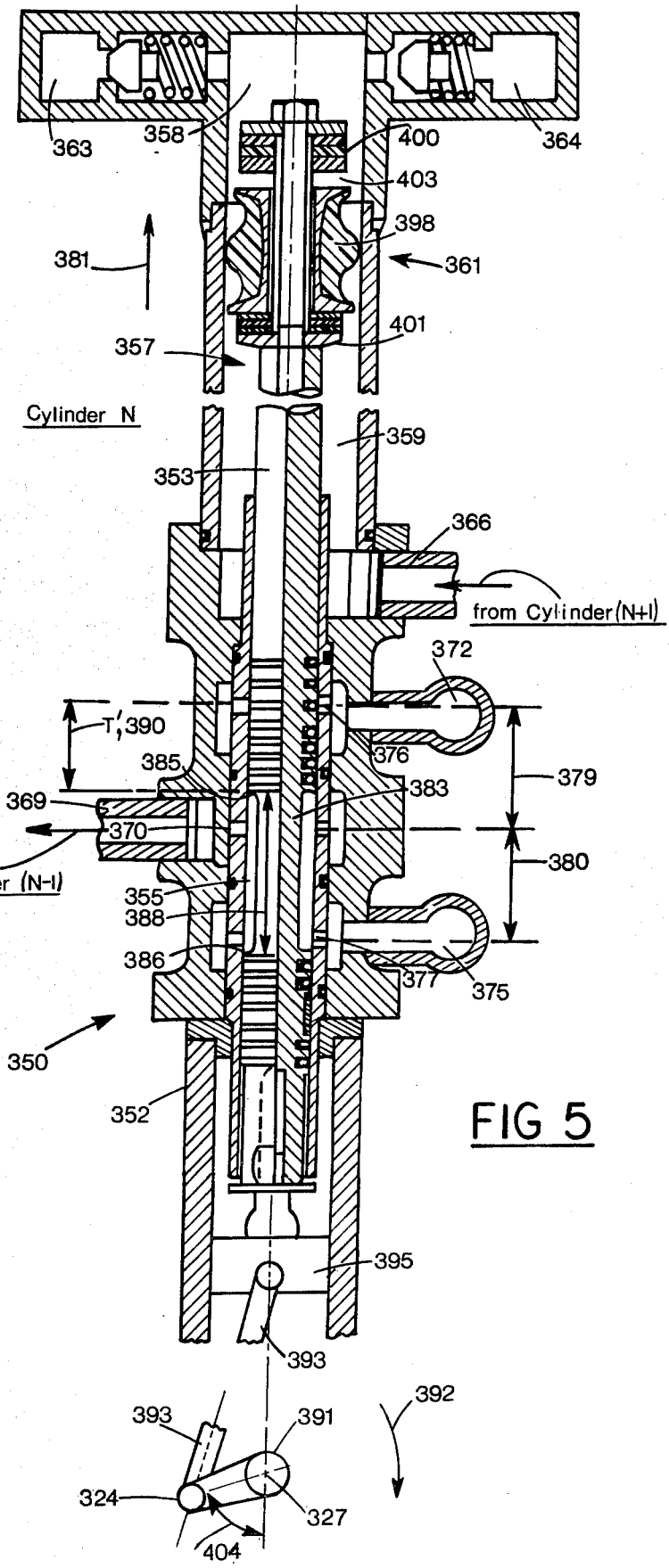
FIG. 5 is a simplified longitudinal section through a typical expansion valve means of the quintuplex feed pump.

The triplex pump has three cylinder cooperating with a crankshaft having three throws. In further alternatives, additional cylinders can be incorporated into the same crankcase, for example a quintuplex or five cylinder feed pump as shown in FIGS. 4 and 5 which is driven by a crankshaft having an appropriate number of throws. If desired, the number of feed cylinders used can be expanded in a manner similar to the multi-cylinder internal combustion engine, so as to be generally similar to radial engines having one or more banks of cylinders. The arrangement of inlet, outfeed and return conduit means is generally similar to that as described, and the expansion chamber valve means, ie. the spool valves or equivalent, will cooperate with the rotatable drive means so that the respective expansion chamber valve means of each cylinder is phased relative to the drive means to provide a desired dwell interval between valve actuation and displacer means movement. This can be attained without complex timing mechanism in a manner equivalent to that as previously described so that the valve means associated with the one cylinder directs concentrate fluid to and from another cylinder, not necessarily an adjacent cylinder but a cylinder phased so as to be at a desired dwell. In the multi-cylinder embodiments envisaged with two or more banks of radially disposed cylinders, there could be an interconnection between the valves on one bank with the cylinders on an adjacent bank. In such an arrangement, a group of cylinders where there is fluid flow between the valve associated directly with one cylinder to another cylinder in that group is referred to as a cooperating set of cylinders. Clearly, many combinations are possible and in particular, for valve phasing as above described, the total number of cylinders in a cooperating set would be factored by an integral odd number greater than one. Particularly desirable numbers of cylinders are 3 and 5 cylinder embodiments as exemplified herein, and these can be combined in two banks of totals of 6 and 10 cylinders respectively. Because of the need for substantial dwell, the above definition excludes feed pumps having total numbers of the cylinders such as 2, 4, 8, 16, etc. which would result in a phase difference of exactly 90° or 180° which would be unsuitable for providing dwell when using spool valves integral with displacer rod means.

FIGS. 4 and 5

Some of the limitations of the triplex feed pump 170 of FIG. 1 are reduced by using a quintuplex feed pump, ie. five cylinders in a cooperating set. Most of the structure of quintuplex feed pump is not described in detail as it is basically similar to the triplex pump, but the sequence of operation can be ascertained by the inspection of a simplified timing diagram of FIG. 4, and of the expansion chamber valve means of FIG. 5. In view of the similarities in structure and operation between the three and five cylinder pumps, only the major differences between the three and five cylinder pumps will be discussed with reference to FIGS. 4 and 5.

Referring mostly to FIG. 4, a five cylinder feed pump, has a crankshaft having five crank pins designated 321, 322, 323, 324 and 325 disposed about a crankshaft axis 327, the crank pins being disposed at a particular instant at corresponding positions on the diagram designated 331, 332, 333, 334 and 335. The crank pins are connected to displacer rods of corresponding cylinders, and are spaced equally apart from each other, a typical phase angle between the crank pins 321 and 322 being designated C' which is 360/5=72°. With respect to the direction of rotation of the drive means, those cylinders lagging and leading a particular cylinger N by the phase angle of 72° are designated N−1 and N+1 respectively. At the instant as drawn, the crank pin 324 is at 72° past BDC (bottom dead center) and the crank pin 323 is at BDC. In the preferred arrangement, a valve spool shown in FIG. 5 only, is mounted on the crank pin 324 and controls fluid flow to the expansion chamber of the feed cylinder corresponding to, ie. directly associated with, the crank pin 323. If the cylinder directly associated with the crank pin 324 is designated cylinder N, the valve spool of cylinder N+1, ie. directly associated with the crank pin 325, will open the expansion chamber of the controlled cylinder N to either exhaust pressure or membrane pressure depending on the position of the spool. Thus the crank pin carrying a particular valve is leading the cylinder which that particular valve controls which contrasts with the triplex pump where the valve crank pin lags the cylinder which that particular valve controls. Also the cylinder N has an adjacent expansion chamber valve means associated directly therewith which controls the expansion chamber of remote controlled cylinder N=1, ie. the cylinder directly associated with the crank pin 323, and has an expansion chamber which is controlled by the remote controlling valve means which is associated directly with cylinder N+1.

Similarly to the timing diagram of FIG. 2, overall diameter of the diagram is designated P' which represents total stroke of each displacer rod. Dimension R' represents corresponding stroke of the displacer, which is shorter than the stroke P' by an amount Q' which relates to linear lost motion due to angular dwell interval D'. For a five cylinder pump, a practicable angular dwell D' is 36°. The dwell angles D' for the five crank pins are shown as broken lines which intersect the circumference at dwell points 338, 339, 340, 341 and 342 corresponding to the respective crank pins 321 through 325. In this instance, because the crank pin bearing the valve is leading the corresponding cylinder that it controls, the dwell angle D' for the cylinder associated directly with the crank pin 323, ie. the point 340, is drawn ahead of the corresponding displacer crank pin 323. It can be seen that R' is the projection from the circumference where dwell angle D' of crank pin 323 intersects the circumference.

Broken line 346 represents the projection of the dwell angle for a displacer at BDC, which in this instant is the cylinder N−1 associated directly with the crank pin 323. A similar broken line 347 parallel thereto represents a corresponding projection line for dwell of a displacer at TDC. Two additional broken lines 348 and 349 represent space between valve opening and valve closing positions and represent valve overlap T' for the valve spool, which is equivalent to the valve overlap length or sealing length T of FIGS. 2 and 3.

From the equation, sealing length $T = P \sin D/2$, for the five cylinder pump, $T' = P'(\sin 18°) = 0.309 \, P'$.

ie. about 31% or one-third of displacer rod stroke which is considerably less than the sealing length T of one-half of the displacer rod stroke of the triplex pump of FIGS. 1 through 3.

Thus when one port is closing, the distance the spool must travel to open the other port, ie. the sealing length or valve overlap for valve spools on the quintuplex pump is less than that of triplex pump. This means that a five cylinder pump can have a shorter dimension from crankshaft axis to the cylinder head than a triplex pump.

Also the minimum lost motion length Q' relating to linear movement of the feed displacer rod prior to contacting the feed displacer is about 10% or one-tenth of the displacer rod stroke, and thus, is less than the corresponding 25% for the triplex pump. It can therefore be seen that, other factors being equal, the displacer rod of the quintuplex pump is travelling at a lower velocity when it contacts the displacer means than the displacer rod of the triplex pump. Thus, the quintuplex pump can be operated at higher speeds than the triplex pump to obtain similar impact forces between the displacer rod stops and the displacer.

An equatorial portion 343 of the circle between the two lines 348 and 349 represents the closed intermediate position of the valve occuring during the dwell period. A polar segment 344 of the circle above the line 349 represents the various positions of the crank pin associated directly with a particular valve when the expansion chamber controlled by that particular valve is exposed to membrane pressure. Similarly a remaining polar segment 345 of the circle below the line 348 represents the various positions of the crank pin when the expansion chamber controlled by the said valve is exposed to exhaust pressure.

Referring specifically to FIG. 5, an expansion chamber valve means 350 for cylinder N includes a valve spool 352 connected directly to a displacer rod 353 and being reciprocable within a valve chamber 355. Cylinder N has a bore designated 357 and has pumping and expansion chambers 358 and 359 separated by a displacer means 361 carried at an outer end of the displacer rod. Valved inlet conduit means 363 and valved outfeed conduit means 364 communicate with the pumping chamber to admit feed fluid and to conduct feed fluid from the pumping chamber. A delivery conduit means 366 communicates the expansion chamber 359 with the expansion chamber valve means of cylinder N+1, now shown. A delivery conduit means 369 extends from a delivery conduit port 370 in the valve chamber to communicate with the expansion chamber of cylinder N−1, not shown. A concentrate return conduit means 372 and an exhaust conduit means 375 communicate through concentrate return and exhaust ports 376 and 377 respectively and are disposed on opposite sides of the delivery port 370. Upper port spacing 379 between the ports 376 and 370, and lower port spacing 380 between the ports 370 and 377 are approximately equal, and generally similar to the equivalent spacing in the triplex pump of FIGS. 1 through 3. Also, similarly to the triplex pump, the concentrate return port 376 is adjacent the expansion chamber 359 so that pressure differences between the ports is reduced to reduce fluid losses.

The valve spool 352 has a clearance portion 383 defined by a pair of spaced shoulders 385 and 386, a space 388 between the shoulders defining length of the clearance portion. A plurality of undesignated piston ring type seals extend on opposite sides of the shoulders to seal the spool for the slidable movement within the valve chamber. As drawn, the rod 353 is executing a pumping stroke and is moving in direction of an arrow 381 and the shoulder 386 is about to close the port 377, and is thus about to enter a dwell period. Length of the clearance portion is such that no more than two adjacent ports can be connected at any one time, and sealing length or valve overlap of the spool T' is defined as a spacing 390 representing the spool travel required to open a port that is closed when two ports have just opened. Thus it can be seen that when the port 377 is about to be closed by movement of the shoulder 386, the additional distance the spool must travel to open the port 376 is approximately the valve overlap T', which, as previously shown, is about 31% of displacer rod stroke. Thus the valve spool has two closure portions and a clearance portion, the clearance portion being disposed between the two closure portions and having a length somewhat greater than spacing between two adjacent ports. Similarly to the previous embodiment, the sum of the port spacings 379 and 380 is approximately equal to the sum of the displacer rod stroke and the valve overlap which is approximately 131% of the displacer rod stroke.

The pump has a crankshaft 391 rotatable about the crankshaft axis 327 in direction of an arrow 392, and carrying the throw 324 of cylinder N. The throw 324 carries a connecting rod 393 which, through a cross head means 395, transmits crankshaft motion as quasi simple harmonic motion to the displacer rod. The displacer means 361 has a piston disc 398 which is slidable along the piston rod means between spaced stops 400 and 401, spacing between the stops and thickness of the disc providing a spacing 403 which represents lost motion Q' of the piston disc relative to the displacer rod upon reversal of piston rod action, which as previously shown is about 10% of displacer rod stroke. Similarly to the FIG. 3 embodiment, the annular piston disc 398 mounted between the stops has a resilient outer portion which deflects substantially in shear.

Operation of the five cylinder pump will be described briefly with reference to the cylinders associated directly with the crank pins 323, 324 and 325 of FIG. 4, termed cylinders N−1, N and N+1 respectively. At the instant shown in FIGS. 4 and 5, the crank pin 324 of cylinder N is at an angle 404, ie. the phase angle C' of 72°, past BDC. The cylinder N is executing a pumping stroke and the spool 352 is about to close the exhaust port 377, thus commencing a dwell period for the cylinder N−1 which is controlled by the spool 352. This is apparent from FIG. 4 as the crank pin 323 of cylinder N−1 is at BDC and the crank pin 324 of cylinder N is about to enter the equatorial portion 343 of the circle.

Likewise, the crank pin 325 of cylinder N+1 carrying the valve which controls the flow to cylinder N is in the polar segment 344 so as to expose the expansion chamber of cylinder N to membrane pressure to assist in pressurizing fluid in a pumping stroke. It can be seen that rotation of the crank pins around the axis 327 reflects the various functions of the cylinders at particular instants of time.

In the quintuplex pump, the drive means cooperates with the displacer rods so that when a displacer rod of a particular cylinder completes a stroke travelling in one direction, another displacer rod having a valve portion which controls that particular cylinder is approaching the mid stroke position of said other displacer rod travelling in an opposite direction, which contrasts with the triplex pump.

For the three and five cylinder feed pumps, the dwell angle D or D' is one-half of the respective phase angle C or C', however this simple relationship does not apply for all multi-cylinder feed pumps. By inspection of the timing diagram, in an alternative quintuplex arrangement, the crank pin controlling the valve of a particular cylinder could lag the crank pin associated with the displacer of that particular cylinder by an alternative phase angle of 144°, but this would result in an impractically long dwell interval with correspondingly excessive loss in displacement of the displacer. In all embodiments, it can be seen that the valve spool has a valve overlap length dependent on the number of cylinders in a cooperating set and the conduit connections between the respective cylinders and valve chambers.

In summary, in each embodiment the method is characterized by actuating directly with a displacer rod an associated expansion chamber valve means so as to control flow relative to a cylinder other than that directly associated with the displacer rod. The method is further characterized by actuating the displacer rods of the cylinders so that the cylinders are phased apart in such a way that when a particular displacer rod of a particular cylinder reaches an end of each stroke, another displacer rod associated directly with the expansion valve means controlling that particular cylinder is approaching a mid stroke position of said other displacer rod thereof so that the expansion chamber valve means directly associated with said other displacer rod is entering the closed intermediate position thereof.

I claim:

1. A reciprocating feed pump for an apparatus for separating a feed fluid into a permeate fluid and concentrate fluid fractions which respectively are permeated and rejected by selective membrane means, the pump having at least three feed cylinders in a cooperating set, each cylinder having a displacer reciprocable within the respective cylinder by a displacer rod, the displacer dividing each cylinder into expansion and pumping chambers having relative displacements which determine approximately recovery ratio of permeate fluid fraction to total feed fluid flow; each pumping chamber communicating with valved inlet conduit means to admit feed fluid, and with valved outfeed conduit means to conduct feed fluid to the membranes, each cylinder also having a corresponding expansion chamber valve means which controls flow relative to the corresponding expansion chamber and has a first open position in which a concentrate return conduit means conducts concentrate fluid from the membranes to the expansion chamber, and a second open position to exhaust depressurized concentrate fluid from the expansion chamber, the pump being further characterized by:
  (a) each expansion chamber valve means has a closed intermediate position between the two open positions thereof and includes a valve portion associated directly with the respective displacer rod of each cylinder, each valve portion being a portion of an expansion chamber valve means controlling flow relative to a cylinder other than that directly associated with the respective displacer rod,
  (b) each cylinder having associated dwell means to permit initial travel of the displacer rod of a particular cylinder following a beginning of the respective displacer rod stroke, while the corresponding expansion chamber valve means controlling that particular cylinder is in the closed intermediate position thereof,
  (c) drive means cooperating with the displacer rods of the cylinders so that the cylinders are phased apart in such a way that when a particular displacer rod of a particular cylinder reaches an end of each stroke thereof, another displacer rod that is associated directly with, and thus actuates, the expansion chamber valve means controlling that particular cylinder is approaching a mid stroke position of said other displacer rod, so that the expansion chamber valve means directly associated with said other displacer rod is entering the closed intermediate position thereof.

2. A pump as claimed in claim 1 in which the drive means is a rotating drive means and the cylinders are phased approximately equally apart.

3. A pump as claimed in claim 1 further characterized by:
  (a) the dwell means of each cylinder is operatively associated with the pumping and expansion chambers thereof to exchange volume between the chambers of a particular cylinder while the corresponding expansion valve means controlling that particular cylinder is in the closed intermediate position thereof, so as to prevent hydraulic lock of the displacer means.

4. A pump as claimed in claim 1 further characterized by:
  (a) plunger means associated with each displacer rod to vary volume of the displacer rod in a particular cylinder after the beginning of each stroke and whilst the respective expansion chamber valve means controlling that cylinder is in the closed intermediate position thereof, so that pressures across ports of the respective expansion chamber valve means that are about to be opened are approximately equalized prior to opening of such ports.

5. A pump as claimed in claim 3 or 4 further characterized by:
  (a) the displacer rod has a pair of spaced stops thereon,
  (b) the displacer means includes an annular piston mounted between the stops and having a resilient outer portion which deflects substantially in shear, the deflection providing exchange of volume between the expansion and pumping chambers upon reversal of stroke of the displacer rod.

6. A pump as claimed in claim 1 in which the expansion chamber valve means is a spool valve and is further characterized by:
  (a) the valve portion associated directly with each displacer rod being a valve spool,
  (b) a valve chamber having a bore to accept the valve spool to be reciprocable therein, the valve chamber having a concentrate return port admitting concentrate fluid from the membranes, an exhaust port to exhaust concentrate fluid, and a delivery port communicating with the expansion chamber of the cylinder controlled by the expansion valve means.

7. A pump as claimed in claim 6 further characterized by:
  (a) the concentrate return port is located at an end of the valve chamber adjacent the cylinder directly associated with the expansion valve means,
  (b) the exhaust port is located at an end of the valve chamber remote from the cylinder directly associated therewith.

8. A pump as claimed in claim 1 in which the number of cylinders in a cooperating set is three, and the pump is further characterized by:
  (a) the drive means cooperating with the displacer rods so that when a displacer rod of a particular cylinder completes a stroke travelling in one direction, another displacer rod having a valve portion which controls that particular cylinder is approaching the mid stroke position of said other displacer rod travelling in the same direction.

9. A pump as claimed in claim 1 in which the number of cylinders in a cooperating set is five, and the pump is further characterized by:
  (a) the drive means cooperating with the displacer rods so that when a displacer rod of a particular cylinder completes a stroke travelling in one direction, another displacer rod having a valve portion which controls that particular cylinder is approaching the mid stroke position of said other displacer rod travelling in an opposite direction.

10. A pump as claimed in claims 6 or 7 further characterized by:
  (a) the valve portion has a closure portion positioned relative to the ports of the valve chamber so that the closure portion prevents direct flow of fluid between the concentrate port and exhaust port, but never directly obstructs these ports.

11. A pump as claimed in claims 6 or 7 in which the valve portion has closure portions positioned relative to the ports so as to close both the concentrate return port and the exhaust port when the valve is closed, and yet never to directly obstruct the delivery port.

12. A pump as claimed in claim 10 in which the valve spool has a valve overlap length dependent on the number of cylinders of the pumping apparatus in a cooperating set and the conduit connections between the respective cylinders and valve chambers.

13. A pump as claimed in claim 6 or 7 in which the number of cylinders in a cooperating set is three, and the pump is further characterized by:
  (a) the valve spool having a closure portion disposed between two clearance portions,
  (b) the closure portion has a length approximately equal to one-half of the displacer rod stroke,
  (c) the delivery port is disposed between the concentrate return port and the exhaust port and is spaced axially at approximately equal distances therefrom.

14. A pump as claimed in claim 13 further characterized by:
  (a) the displacer rods are phased equally apart at 120°, and with respect to direction of rotation those cylinders lagging and leading the particular cylinder N by 120° are designated N−1 and N+1, (b) cylinder N has an adjacent expansion chamber valve means associated directly therewith which controls the expansion chamber of the remote controlled cylinder N+1, and has an expansion chamber which is controlled by the remote controlling valve means which is associated directly with a cylinder N−1.

15. A pump as claimed in claim 3 or 14 in which the number of cylinders in a cooperating set is three, and the pump is further characterized by:

(a) the displacer means has a piston means slidably mounted on the displacer rod to provide lost motion upon reversal of the rod stroke of about one-quarter of the rod stroke, (b) the valve spool has a valve overlap length defining travel of the valve spool during which two ports thereof are maintained separated, of about one-half of the stroke of the displacer rod means.

16. A pump as claimed in claim 6 or 7 in which the number of cylinders in a cooperating set is five, and the pump is further characterized by:

(a) the valve spool has two closure portions and a clearance portion, the clearance portion being disposed between the two closure portions and having a length somewhat greater than spacing between two adjacent ports, (b) the delivery port is disposed between the concentrate return port and the exhaust port and is spaced axially at equal distances therefrom.

17. A pump as claimed in claim 16 further characterized by:

(a) the displacer rods are phased equally apart at 72° and, with respect to direction of rotation of the drive means, those cylinders lagging and leading the particular cylinder N by 72° are designated N−1 and N+1 respectively, (b) cylinder N has an adjacent expansion chamber valve means associated directly therewith which control the expansion chamber of remote controlled cylinder N−1, and has an expansion chamber which is controlled by the remote controlling valve means which is associated directly with cylinder N+1.

18. A pump as claimed in claim 3 or 17 in which the number of cylinders in a cooperating set is five, and the pump is further characterized by:

(a) the displacer means has a piston means slidably mounted on the displacer rod to provide lost motion upon reversal of the rod stroke of about one-tenth of the rod stroke, (b) the spool valve has a valve overlap length defining travel of the valve spool during which two ports thereof are closed of about one-third of the stroke of the displacer rod means.

19. A method of membrane separation of a feed fluid into permeate fluid and concentrate fluid fractions which respectively are permeated and rejected by selective membrane means, the membrane means being exposed to pressurized feed fluid supplied by a reciprocating feed pump having at least three feed cylinders in a cooperating set, each cylinder having a displacer means which is reciprocable within the respective feed cylinder, the displacer means dividing the respective cylinder into a pumping chamber in which, during a pumping stroke, feed fluid is pressurized and an expansion chamber in which concentrate fluid is depressurized, each cylinder having a displacer rod for reciprocating the respective displacer means, each cylinder cooperating with valve means in conduit means which communicate with the membrane means, the valve means including an expansion chamber valve means which controls flow relative to the corresponding expansion chamber; the method, which occurs in each cylinder, including the steps of: inducting feed fluid into a particular pumping chamber and simultaneously exhausting concentrate fluid from a corresponding expansion chamber during an induction stroke, followed by pressurizing the feed fluid in the pumping chamber and simultaneously admitting pressurized concentrate fluid into the corresponding expansion chamber to supplement energy supplied to the displacer means during the pumping stroke, the method being further characterized by:

(a) actuating directly with each displacer rod a valve portion of an associated expansion chamber valve means of each cylinder so as to control flow relative to an expansion chamber of a cylinder other than that directly associated with the displacer rod, (b) actuating the displacer rods of the cylinders so that actuation of the expansion chamber valve means is phased in such a way that when a particular displacer rod of a particular cylinder reaches an end of each stroke thereof, another displacer rod associated directly with the expansion chamber valve means controlling that particular cylinder is approaching a mid stroke position of said other displacer rod, so that the expansion chamber valve means directly associated with said other displacer rod is entering a closed intermediate position thereof during which no fluid passes therethrough, (c) permitting initial travel of the displacer rod of each cylinder following beginning of each respective displacer rod stroke while the corresponding expansion chamber valve means controlling that particular cylinder is in the closed intermediate position thereof.

20. A method as claimed in claim 19 further characterized by:

(a) in each cylinder, exchanging fluid volume between the pumping and expansion chambers of a particular cylinder while the corresponding expansion valve means controlling that cylinder is in the closed intermediate position thereof so as to substantially eliminate hydraulic lock.

21. A method as claimed in claim 19 or 20 further characterized by:

(a) in each cylinder, varying the volume of the respective displacer rod therein after the beginning of each respective stroke and whilst the respective expansion valve means controlling that cylinder is in the closed intermediate position thereof, so that pressures across ports of the respective expansion valve means that are about to be opened are approximately equalized prior to opening of such ports.

22. A method as claimed in claim 19 in which the number of cylinders in a cooperating set is three, and the method is further characterized by:

(a) controlling the fluid flow to the expansion chamber of cylinder N by an expansion valve means associated directly with a displacer rod of cylinder N−1, where N increases in the direction of rotation.

23. A method as claimed in claim 19 in which the number of cylinders in a cooperating set is three, and the method is further characterized by:
  (a) actuating the displacer rods so that when a displacer rod of a particular cylinder completes a stroke travelling in one direction, another displacer rod having a valve portion which controls that particular cylinder is approaching the mid stroke position of said other displacer rod travelling in the same direction.

24. A method as claimed in claim 19 in which the number of cylinders in a cooperating set is five, and the method is further characterized by:
  (a) controlling the fluid flow to the expansion chamber of cylinder N by an expansion valve means associated directly with a displacer rod of cylinder N+1, where N increases in the direction of rotation.

25. A method as claimed in claim 19 in which the number of cylinders in a cooperating set is five, and the method is further characterized by:
  (a) actuating the displacer rods so that when a displacer rod of a particular cylinder completes a stroke travelling in one direction, another displacer rod having a valve portion which controls that particular cylinder is approaching the mid stroke position of said other displacer rod travelling in an opposite direction.

* * * * *